May 1, 1962 E. P. BERNARDI, SR 3,031,741
MECHANISM FOR REBUILDING ROLLERS
Filed Nov. 27, 1959 5 Sheets-Sheet 1
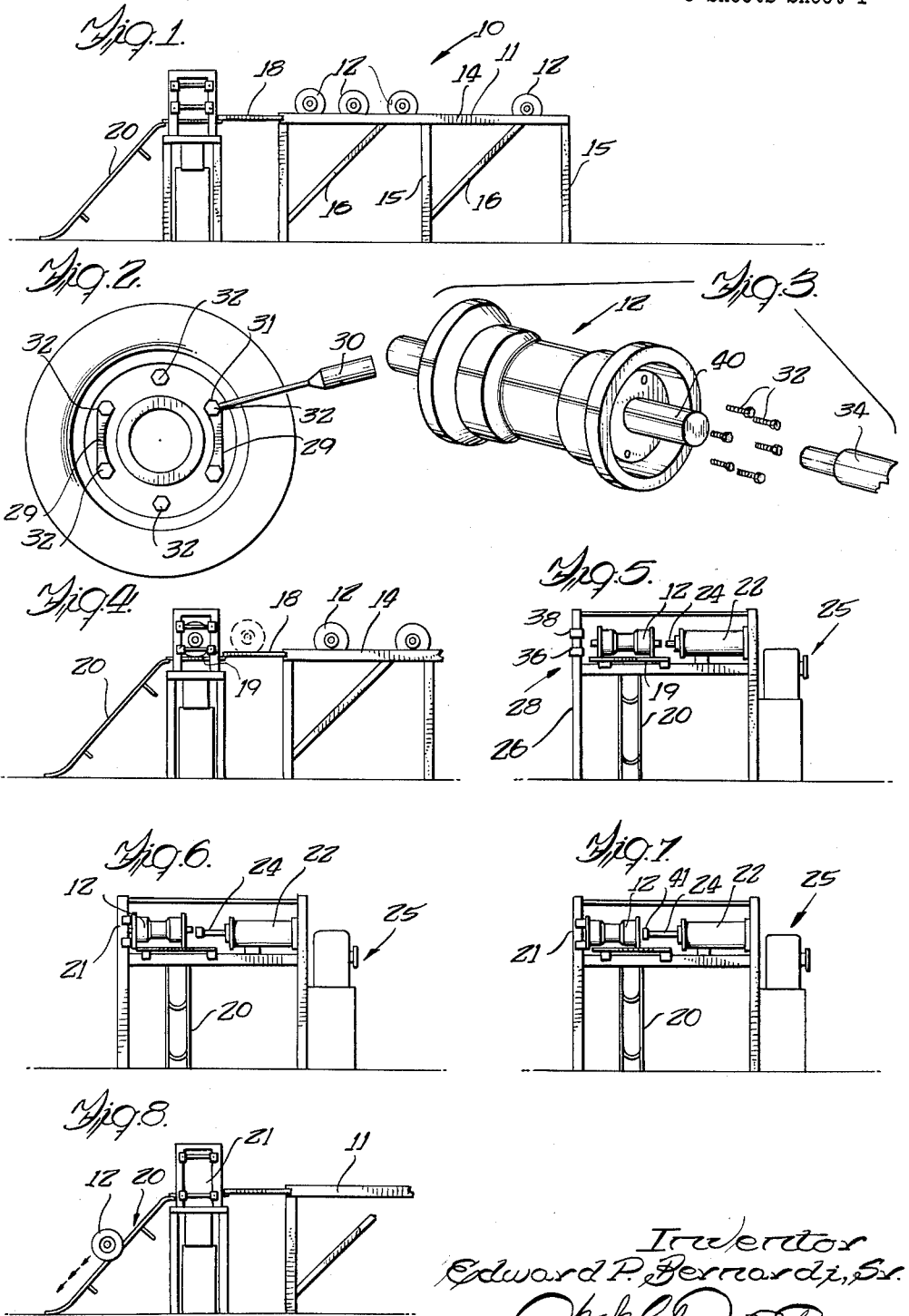

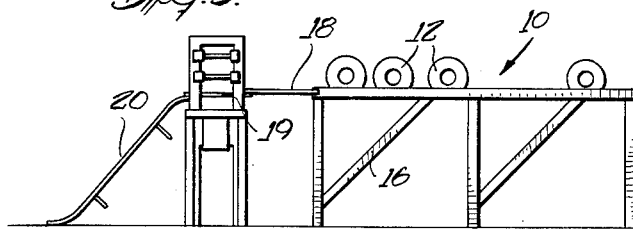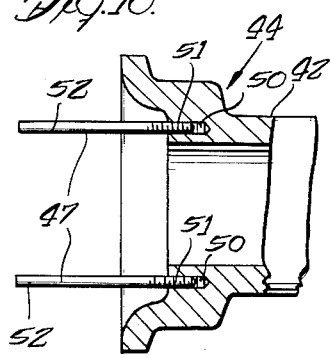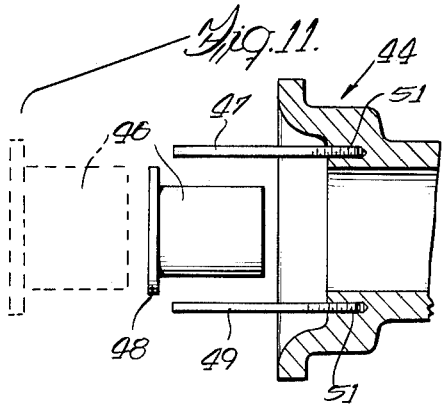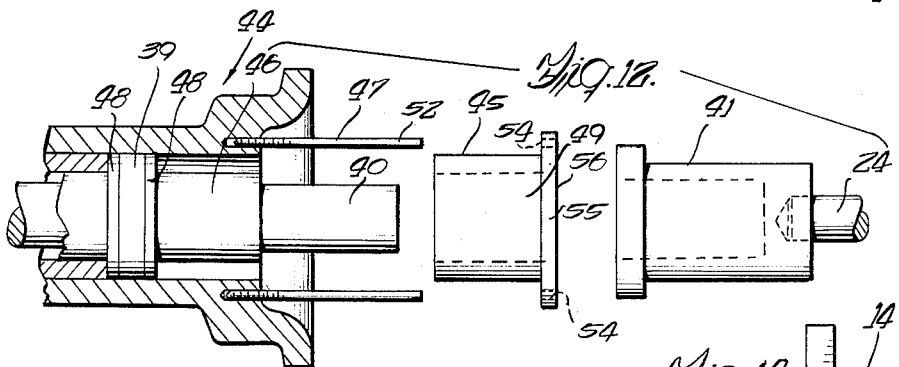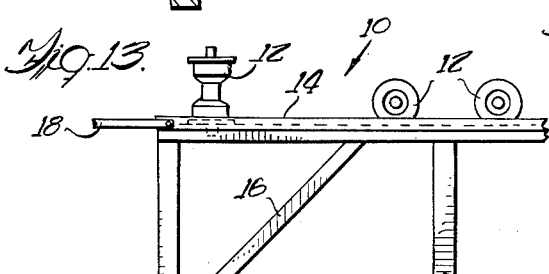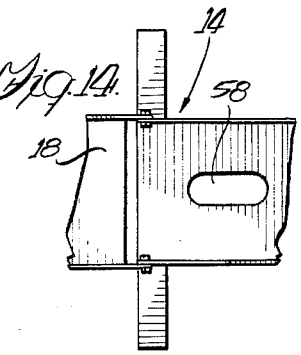

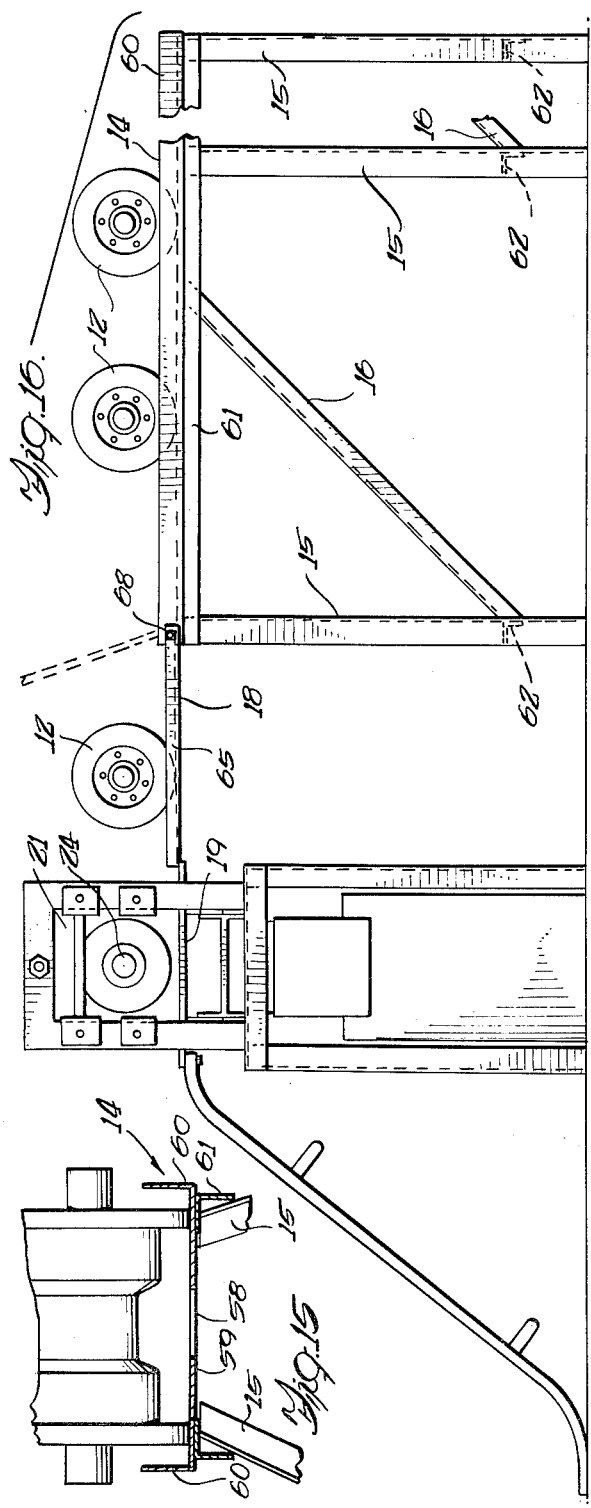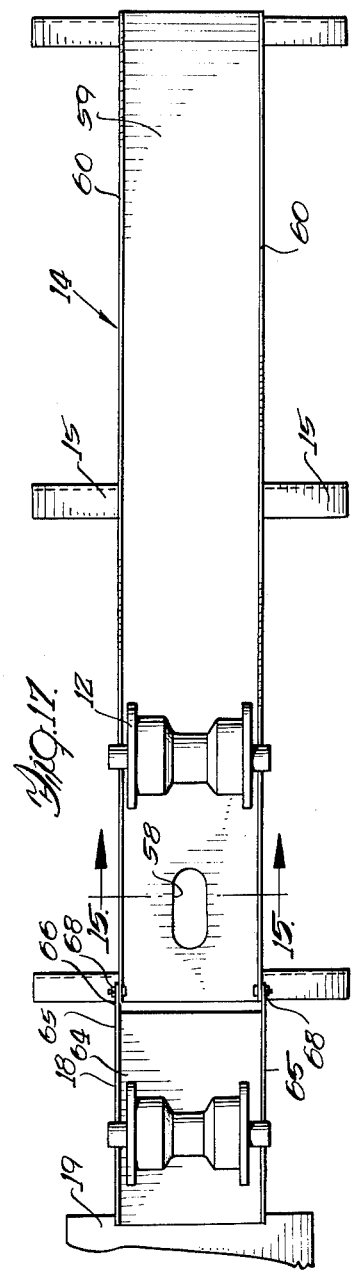

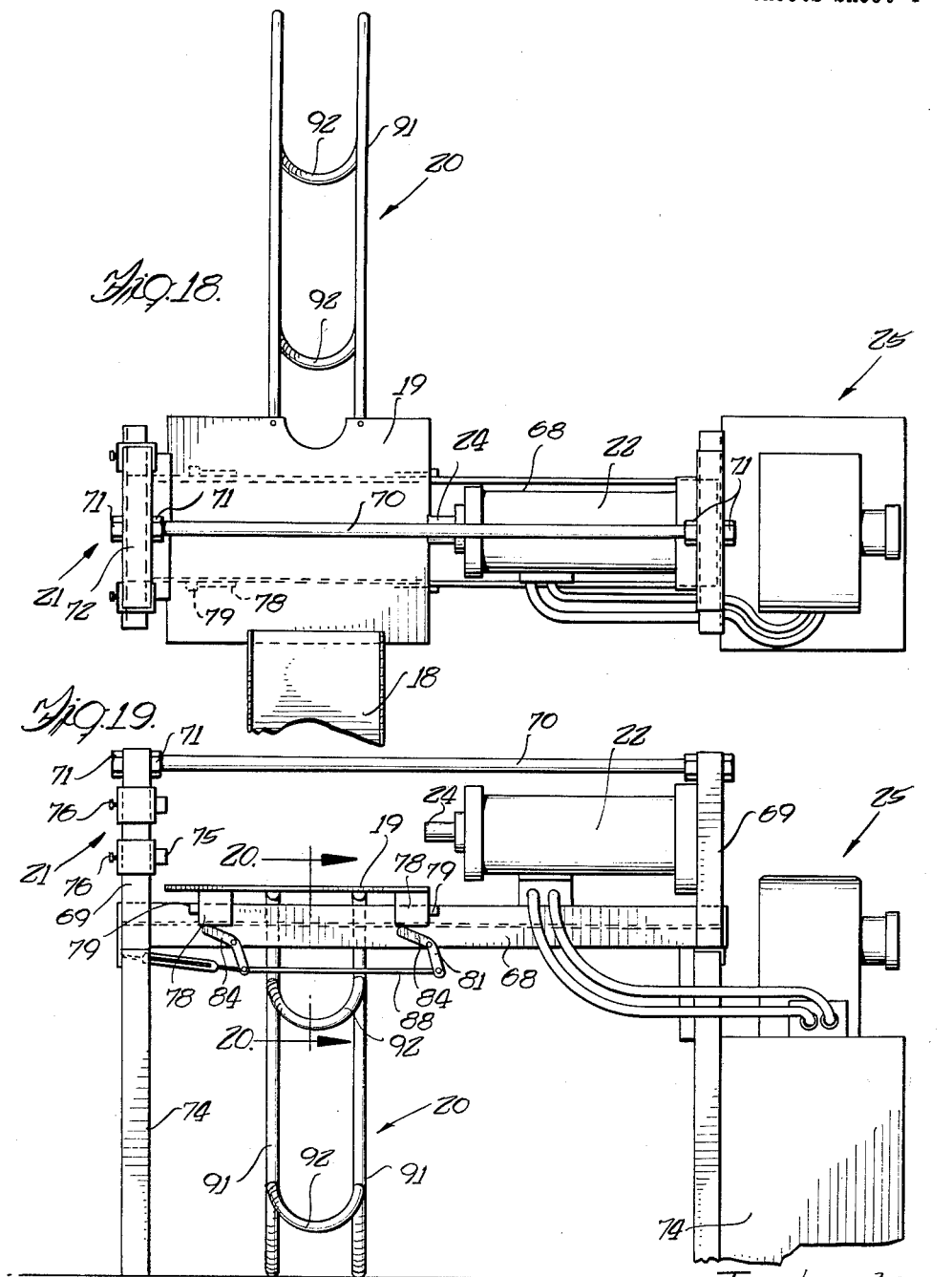

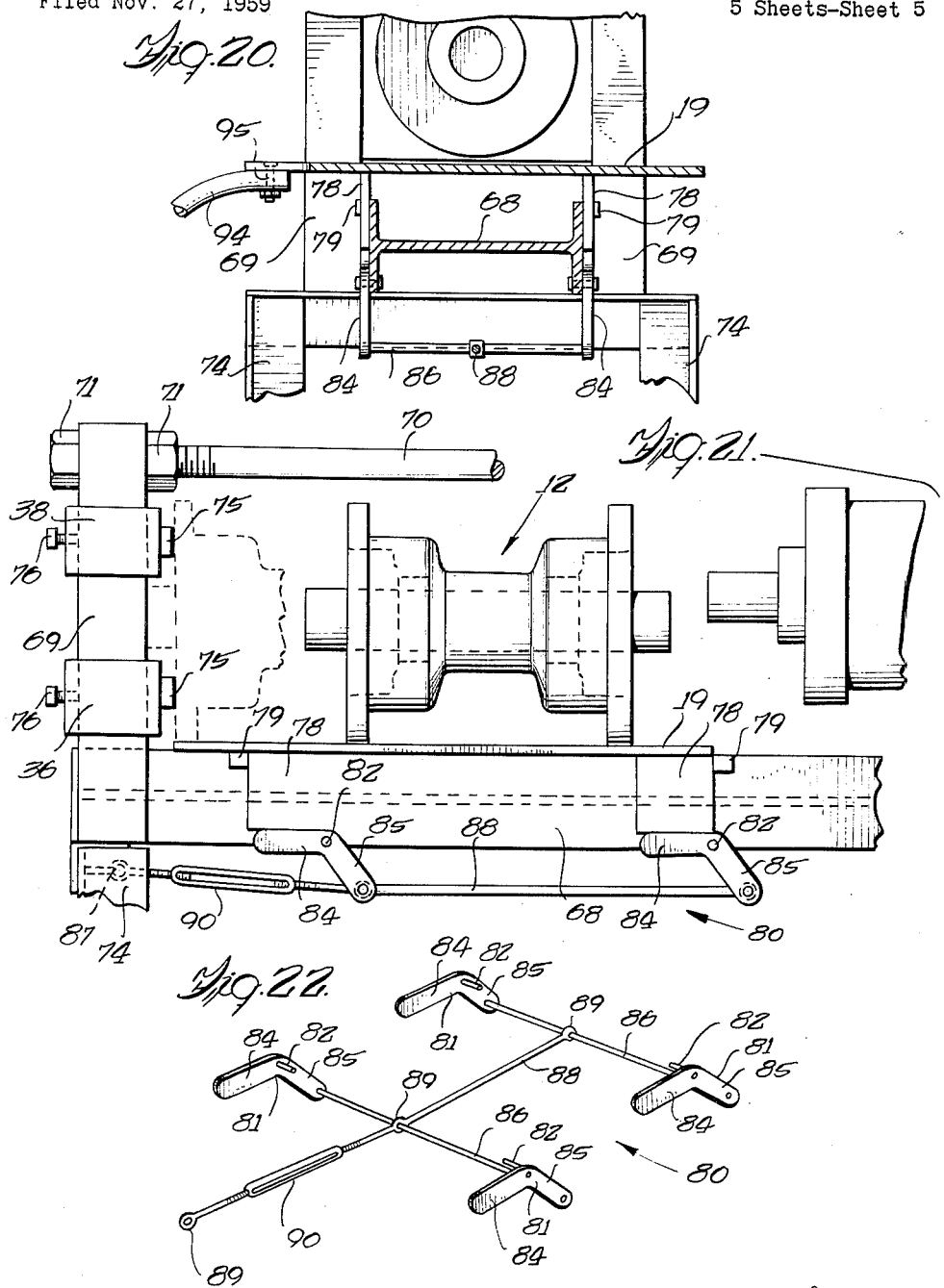

United States Patent Office 3,031,741
Patented May 1, 1962

3,031,741
MECHANISM FOR REBUILDING ROLLERS
Edward P. Bernardi, Sr., Danville, Ill., assignor to W. M. Hales Company, Inc., a corporation of Illinois
Filed Nov. 27, 1959, Ser. No. 855,613
6 Claims. (Cl. 29—200)

The subject invention relates to a mechanism for rebuilding rollers of the character finding particular application in caterpillar type tractors. It will be appreciated, of course, that the mechanism is similarly adaptable for rebuilding the rollers employed in a wide variety of crawler-track vehicles. Closely related to the mechanism contemplated by the invention is a method for rebuilding crawler-type rollers which will be outlined in detail hereinafter.

In the constant use of crawler-track type vehicles, excessive wear and tear takes place on the rollers which are journaled on the vehicle to support the crawler tracks. Dirt, grit, and other abrasive substances cause the outer portion of the roller to wear away in usage, and similarly cause damage to the inter-bushing and other moving portions of the rollers. Thus the rollers, and their adjacent tracks, require repair and rebuilding periodically long before the basic vehicle is worn out. A substantial business has grown up in the rebuilding of these rollers. It has been learned that by disassembling the rollers and building up a coat of weld metal along their exterior working surface that the rebuilt units are substantially as satisfactory in operation as the original equipment. Indeed, many instances are on record where it is believed that the rebuilt units are superior to the original equipment. In addition, the fact that only certain portions of the roller are replaced in the rebuilding operation, a rebuilt roller can be purchased from a rebuilding organization for a substantially lower price than factory new equipment.

In the rebuilding operation, it has heretofore been the practice to disassemble the rollers on work benches, and then take the disassembled parts to a separate area where they are refinished. Subsequently the rollers are reassembled on a work bench, and then moved to a conventional convertible-type press which is employed to reinsert the bushings, and other parts into the roller in order to hold the axle in place and condition the roller for use. Since many of the rollers weigh over 100 pounds, and one standard part weighs as much as 160 pounds, two men are required to handle the roller in order to place it into position in the vertical presses of the character normally employed.

The present invention contemplates a horizontally oriented mechanism with a horizontally oriented press which permits the stationing of all of the rollers for a crawler vehicle on the subject mechanism, and the disassembly and subsequent reassembly of the rollers merely by rolling them horizontally and adjusting them on the mechanism. Thus the heavy lifting operations are eliminated and it has been observed that in operation one man can disassemble approximately ten rollers in an hour. With the mechanisms employed by the prior art, one man can disassemble approximately ten rollers per hour. Upon reassembly the results are such as to effect similar savings in time. For example, by using the prior art mechanisms one man can reassemble one roller per hour. With the subject mechanism, one man can readily assemble four rollers per hour. On timed tests with a stop watch, one man has actually reassembled a roller in less than eight minutes with the subject mechanism. In addition to the mechanism, a method is contemplated by the present invention, which, when used with the subject mechanism, or other mechanisms which may be developed, he achieved similar results as compared with the pre-existing methods of remanufacturing rollers.

In view of the foregoing, it is the principal object of the present invention to provide a mechanism for rebuilding rollers which, by eliminating lifting during the various operations involved, achieves an unusual increase in man hour productivity in the course of rebuilding crawler vehicle type rollers.

Another object of the present invention is to provide a mechanism for rebuilding rollers which is sturdy and durable, and therefore is susceptible of the irreducible minimum of down time.

Still another object of the present invention is to provide a mechanism for rebuilding rollers which removes the rollers from the floor of the shop during the disassembly and assembly operations in order to isolate the rollers from dirt and other contaminants during the disassembly and reassembly phases of the operation.

A still further object of the invention is to furnish a mechanism for rebuilding rollers which assist in accurate production control, work output measure per man, and scheduling by lending itself to batch type operation. A related object of the invention is to furnish a mechanism for rebuilding rollers which will accommodate all of the rollers from a single vehicle simultaneously so that, without additional marking or tagging, the operator can more readily determine defects which are common to the rollers coming from a single vehicle and thereby ascertain the rebuilding requirements more accurately. In addition, of course, such control permits the reporting to the user of the vehicle from which the rollers have been taken any unusual wear characteristics which may be attributable to other factors on the vehicle.

Yet a further object of the present invention is to provide a mechanism for rebuilding rollers which is adjustable for a wide variety and types of rollers without necessitating substantial readjustment.

Further objects and advantages of the present invention will become apparent as the following description of an illustrative embodiment proceeds, the description being offered for purposes of illustration only and not limitation to the specific embodiment disclosed. The drawings in the sheets which follow are:

FIGURE 1 is a head on perspective view of the subject mechanism showing an operator in a typical stage of usage.

FIG. 2 is an end view of an illustrative roller indicating diagrammatically how the lock plate is released.

FIG. 3 is a perspective partially sectioned partially exploded view illustrating diagrammatically how the cap screws are removed from the roller.

FIG. 4 is a diagrammatic front elevation of the subject device illustrating how the roller is moved into position for further disassembly.

FIG. 5 is a diagrammatic end view illustrating the relationship between the hydraulic ram and the roller for axle disassembly.

FIG. 6 is a diagrammatic end view of the mechanism showing the orientation of the roller against the end for removal of the axle.

FIG. 7 is an end view similar to FIG. 6 with the roller reversed for the second removal step in removing the bushing from the roller.

FIG. 8 is a partially broken diagrammatic front elevation of the mechanism illustrating how the roller is discharged off the inclined track after disassembly is completed.

FIG. 9 is a diagrammatic front elevation of the mechanism showing a plurality of roller shells placed in position for reassembly.

FIG. 10 is a partially broken partially perspective view illustrating how the guide pins are inserted prior to attaching the bearing bushing.

FIG. 11 is a view similar to FIG. 10 illustrating diagrammatically where the bearing and bushing are placed.

FIG. 12 is a view similar to FIGS. 10 and 11 further illustrating diagrammatically the elements employed in assembling the axle and bushing including the showing of an adaptor attached to the hydraulic ram at the right hand side thereof.

FIG. 13 is a partially broken diagrammatic view of the trough of the mechanism showing how the rollers are up ended in order to complete the reassembly.

FIG. 14 is an enlarged partially broken top view of the end of the trough illustrating the recessed portion which facilitates the up ending of the roller as shown in FIG. 13.

FIG. 15 is a partially broken partially transverse section of the trough and associated roller taken along section line 15—15 of FIG. 17.

FIG. 16 is an enlarged front elevation, partially broken, of the trough assembly and press portion of the mechanism showing also the discharge track.

FIG. 17 is a top view of the mechanism as shown in FIG. 16 but broken away at the press portion to better illustrate the relationship between the trough, bridge, and press table.

FIG. 18 is an enlarged partially broken top view showing primarily the press assembly and the discharge track.

FIG. 19 is an enlarged front elevation of the press mechanism taken from a position with the bridge portion of the trough upraised.

FIG. 20 is an enlarged partially broken transverse section of the press mechanism and press table taken along section line 20—20 of FIG. 19.

FIG. 21 is an enlarged partially diagrammatic, partially broken view of the adjustable press table and jaws taken generally from the same elevation as shown in FIG. 19.

FIG. 22 is an enlarged perspective view of the press table adjustment mechanism.

The invention will be best understood and appreciated by first referring to FIGURE 1 and noting generally the organisation and construction of the rebuilding device 10 shown there. It will be noted that the device contemplates a supporting structure 11 upon which a plurality of the rollers 12 are oriented. The supporting stand 11 generally contemplates a trough 14 and an under structure made up of a plurality of legs 15 with cross braces 16. A hinged bridge 18 connects the trough 14 with an adjustable table 19. After the rollers 12 have been worked upon, they are discharged by means of the inclined track 20 down to floor level where they may be handled by hand or by various known materials handling equipment for storage.

Referring now to FIGS. 5, 6 and 7, it will be observed that the adjustable table 19 is between the ram and a roller support means that includes a pair of jaws 21 which are adjustable to accommodate a wide variety of rollers 12. The adjustable table 19, has the adjustable jaws 21 at one side, and a hydraulic press unit 22 at its other side. The ram 24 of the hydraulic press unit 22 is actuated by means of an hydraulic pump assembly 25. The hydraulic press unit 22, adjustable jaws 21, and adjustable table 19 are supported by means of a plurality of legs 26 comprising the framework 28 surrounding the press assembly. The discharge track inclined downwardly is secured to the adjustable table 19.

Before describing the device in further detail, it will be best understood in light of the detailed operation of disassembly and reassembly of the rollers 12 in the course of a rebuilding cycle. Referring now to FIG. 2, it will be seen that the capped screw lock plate 29 is first disassembled by means of driving a cold chisel 30 between the upturned locking ends 31 and the cap screw 32. The cap screws 32 are then removed from the rollers 12 by means of an impact wrench designated diagrammatically as 34. After the cap screw lock plate 29 has been removed from one end of the roller 12, and the cap screws 32 also removed, the operation is repeated on the other end of the roller 12. Thereafter the roller is rolled horizontally along the trough 14 on to the pivotally mounted bridge 18 and thence to the adjustable table 19 as illustrated in FIG. 4. As will be observed in FIG. 5, the individual jaws 36, 38, of the jaw assembly 21 can then be adjusted in order to accommodate the end of the roller 12. At this point the roller is positioned for advancing the ram 24 of the hydraulic press unit 22. As the ram 24 advances, it presses the axle 40 of the roller 12 which, because of its internal collar 29, 39 (see FIG. 12) removes the bearing assembly along with the axle. This action is best illustrated in FIG. 6.

The roller 12 is then reversed 180° to the position shown in FIG. 7. At this point, a bearing press adaptor 41 is secured on the end of the ram 24, and the action repeated to discharge the second bearing assembly. Thereafter the roller, having been separated from its internal working members, is rolled forwardly and down the inclined track 20 such as shown in FIG. 8.

Thereafter the parts are moved to separate stations where, by turning on the spindle, weld metal is deposited on the periphery 42 of the roller shell 44. The parts are all cleaned, and the bushing assembly 45 is rebushed with a new bearing surface. In most insulations the bushing assembly 45 contemplates a bushing 46, which has the internal bearing surface upon which the inner portion of the axle 40 rotates. The bushing 46 is placed on to the axle 40 until its external collar abuts against the axle collar 39. Thereafter the bushing housing 49 is pressed on to the external portion of the bushing 46 by means of the bearing press adaptor 41. Before the pressing operation proceeds, however, bushing assembly locating pins 49 are threaded into position in the holes 50 which are tapped for the cap screws 32. The forward portions 51 of the guide pins 49 are threaded to readily engage the threaded cap screw holes 50. Similarly the outer portion 52 of the guide pins 49 are smooth and proportioned to slide readily through the cap screw holes 54 in the bushing seat collar 55.

Thus when ready for reassembly, by reference to FIG. 12, it will be seen that the guide pins 47, at their smooth ends 52, are inserted into the holes 54 of the bushing seat 49. The bearing press adaptor 41 is then brought up against the face 56 of the bushing seat 49. It will be appreciated at this point that the opposite end of the roller shell 44 is against the adjustable jaws 21, thereby permitting the operator to actuate the hydraulic press unit 22 to drive the ram 24 and the bearing press adaptor 41 in order to firmly seat the axle roller shell 44.

At this point the partially reassembled roller 12 is then backed off of the adjustable table 19 on to the trough 14, as illustrated in FIG. 13. The roller assembly 12 is then up ended so that the protruding portion of the axle 40 can extend downwardly through the elongate hole 58 in the trough 14 provided for that purpose (see FIG. 14). This permits the operator to, after removing the first set of guide pins 47, insert them at the other end of the roller shell 44. After the guide pins 47 have been inserted at the opposite end of the roller shell 44, the bushing 46 is moved into place at the opposite end of the axle collar 39 as described above. Thereafter the bushing seat 49 is placed into position on the guide pins 47, the roller then placed down on the trough and rolled across the bridge 18 back into position on the adjustable table 19. At this point the pressing operation is repeated again, and the entire bushing assembly 45 is in place with relation to the axle 40. Thereafter sealing gaskets, lock rings, cap screw lock plates, and cap screws are sequentially assembled substantially in the reverse order of the disassembling operation. These final steps are also taken while the roller assembly 12 is upended on the trough 14 substantially as shown in FIG. 13.

In review, it will be seen that the steps contemplated for disassembling and reassembling the roller assembly 12 are as follows:

(a) Placing a group of rollers along a trough with their axles alined parallel and transverse to the trough;

(b) Straightening cap screw locks with a hand tool;

(c) Removing cap screws;

(d) Rolling each roller thereafter on to a table whereby the roller end is coordinated horizontally with a press;

(e) Pressing one end of the axle horizontally whereby the axle and one bushing are removed;

(f) Horizontally reversing the roller;

(g) Applying an adapter to the remaining bushing and pressing the same out;

(h) Remove roller shell by rolling on to a track for gravity discharge to a group of rollers;

(i) Rebuilding roller surface, cleaning, and preparation for reassembly;

(j) Placing roller shells in a group along the trough with their central axes parallel and transverse to the trough;

(k) Placing guide pins in tapped holes on one side of roller to guide bushing into place;

(l) Rolling on to table and pressing bushing into place and remove guide pins;

(m) Reversing roller 180°, inserting axles, and inserting second bushing on to guide pins and remove guide pins;

(n) Rolling back onto trough adjacent hole in center of trough, reversing roller 90°, upending roller so that axle extends down through hole in trough;

(o) Placing on sealing gaskets, lock rings, cap screws, lock plates and otherwise completing end assembly while upended;

(p) Reversing and upending other end and completing end assembly; and (q) Removing completed roller from trough.

By following the foregoing steps, it will be appreciated that at no time does the operator need to lift the entire weight of the roller assembly 12 which can be as high as 160 pounds. The maximum amount of strength required by the operator is that required to upend the unit, which, because of the ease with which the operator can rest the end of the axle 40, requires an irreducible minimum of physical strength. By virtue of the fact that heavy lifts are eliminated, and all handling can be accomplished at one point close to the machine, unusual efficiencies have been experienced with average operators. Finally, after the entire unit has been reassembled, it is then dropped down on to the trough 14, rolled across the pivotal bridge 18 and across the adjustable table 19 from which it descends down the inclined track 20 to a packaging line or to various materials handling devices which move the completed roller assembly 12 for storage or shipment.

The details of construction of the rebuilding device appear in greater detail in FIGURES 15 through 22. Referring first to FIGURE 15, it will be seen that the trough 14 contemplates a channel-like member having a flat bottom portion 59 and parallel upstanding side walls 60. Below the bottom 59 of trough 14, there are provided a pair of inverted angle iron runners 61, which are closely adjacent to the side rails 60 of the trough 14. The legs 15 which support the trough 14 extend downwardly, and are attached as by welding to the runners 61. As will be seen in FIGS. 15 and 17, the legs 15 are directed outwardly to provide additional stability to the trough 14. The cross braces 16 are tied in from a lower portion of the supporting legs 15 to a point beneath the trough and adjacently runners 61. Additional cross pieces, shown in phantom lines in FIG. 16 and designated 62, convert the structure of the support legs 15 with the trough 14 into a modified A-frame type construction.

Referring now to FIG. 17, it will be seen that the bridge 18 contemplates a channel construction having a flat base portion 64, and short side rails 65. The side rails 65 extend to provide pivoting portions 66 to which pivot bolts 68 are secured in order to lock the bridge 18 pivotally against the side rails 60 of the trough 14. As is shown in dotted lines in FIG. 16, the bridge can then be lifted upwardly so that the operator can move quickly from one side of the trough 14 to the other.

The details of the press portion of the rebuilding device 10 will be better understood by reference to FIGURES 18 and 19. There it will be seen, particularly in FIG. 19, that the press 22 is supported on a horizontally oriented I-beam 68, the orientation of which is transverse to that of the trough 14 and retractable bridge 18. Referring to FIG. 20, it will be seen that the I-beam 68 is secured by means of welding, riveting, or otherwise permanent attachment to the two end posts 69 to which the upper sliding jaw 38 and lower sliding jaw 36 are attached. A tie rod 70 is secured by means of tie rod bolts 71 to the cross piece 72 which joins the upper ends of the end post 69. The lower ends of the end post 69 are secured to the hydraulic press assembly support legs 74. The opposite end of the unit where the hydraulic press cylinder 22 is fixed, is constructed in a similar manner to the end where the sliding jaw assembly 21 is applied. It will be noted that the base portion of the hydraulic cylinder 22 is secured up against the frame structure as generally indicated in FIGS. 18 and 19. The sliding jaws are provided with horizontally oriented jaw tie rods 75, which can be adjusted to varying heights by means of releasing the jaw set bolts 66 and moving the jaws upwardly or downwardly along the end post 69. In this manner the jaws can be positioned to abut the ends of a wide variety of construction of roller assemblies 12, while still permitting the axle portion of the roller assembly 12 to extend between the open portion defined by the flanking jaws in order to permit ready removal by means of the advancement of the ram 24.

The adjustable support table 19 is provided with four depending guides which extend downwardly and have an inner flat surface which abuts up against the two ends of the I-beam 68 as illustrated in FIGS. 19, 20 and 21. The guides 78 are in turn oriented axially along the I-beam 68 by means of the guide stops 79. The guide stops 79 are shown here as small blocks which are secured to the I-beam ends 68 by means of welding, or other convenient assembly techniques.

With the table 19 thusly guided for movement vertically by means of the table guide 78 and guide stop 79, there is then provided an elevating assembly system generally designated as 80 in FIG. 22. There it will be seen that there have been provided for cranks. Each of the cranks is provided with a crank pin 82 at the intersection of the crank lifting leg 84 and crank pulling leg 85. The crank pin 82 is pivotally connected to the end portions of the I-beam 68 at a point generally beneath and at one end of the table guides 78. A pair of crank tie rods 86 are pivotally connected to the end portion of the crank pulling legs 85 and transversely of the I-beam 68. The crank tie rods 86 are in turn unitized by means of a drag link 88. It will be observed that the drag link 88 has three eyes, two of the eyes being engaged by the crank tie rods 86, and the end eye being a portion of the turnbuckle 90. The end eye 89 of the turnbuckle assembly 90 is secured by means of a bolt 87 to the frame. Thus in operation when the operator foreshortens the effective length of the drag link 88 by turning the turnbuckle assembly 90, the crank pulling leg 85 is advanced and similarly the crank lifting leg 84 is elevated. The end of the crank lifting leg 84 then abuts agianst the lower portion of the table guide 78 and lifts the elevated table 19 upwardly as guided by means of the guide stops 79. This elevating assembly 80 is relatively easy to service, easy to adjust by the operator, readily inspected for flaws and defects, and its adjusting portion, the turnbuckle 90, is well out of the operating area after the table 19 has been adjusted to the height intended for the job going through the rebuilding unit 10.

After the roller assemblies 12 have been either completely disassembled, or completely reassembled, they are then discharged along the inclined track 20. The inclined track 20 contemplates a pair of tubular rails 91 which are joined by means of curved ties 92. Each end of the inclined track 20 is reversely curved from the other. Referring more specifically to the upper end 94 of the inclined rail, as illustrated in FIG. 20, it will be seen that the curve is of a sufficient proportion to bring the upper end into a flush relationship with the adjustable table 19. A bolt assembly 95 at each of the ends 94 of the track rails 91 secures the same to the adjustable table 19. The fit between the bolt assembly 95 and the rails 94 is somewhat sloppy in order to provide for adjustment of the inclined track 20 as the table 19 is elevated or lowered.

In review it will be seen that the rebuilding assembly 10 generally contemplates an elongated trough 14 on which a job of rollers can be placed. Normally this will amount to a group of eight to twelve rollers, although this may vary. The rollers are then rolled along the trough 14 across the adjustable bridge 18 on to an adjustable elevation table 19. The folding bridge 18 permits the operator to move to either side of the trough 14 for various operations which should be performed on either end of the roller assemblies 12, without having to exert any force on the rollers 12 to move them into position for easy work.

The adjustable table is then axially aligned between the hydraulic press assembly 22 and adjustable jaws 21 which permit the roller to be manoeuvred around on the table 19 and the hydraulic press assembly 22 to remove the bushings and axle or reassemble the same after rebuilding operations have been conducted. A convenient adjustment assembly 80 is provided beneath the table 19 so that it can be adjusted to various heights depending upon the type of roller assembly employed and the coordinated relationship between the adjustable jaw assembly 21.

A guide rail which is inclined and attached to the adjustable table 19 is provided at the far end of the unit so that after the disassembly or rebuilding operations are completed, the rollers may be rolled directly downwardly on to the floor and discharged to a point where power driven materials handling equipment can move them further. Because of the particular construction and unique method employed as outlined above, unusual operating efficiencies have been achieved. One of the primary reasons for this efficiency is orienting the roller assemblies in a horizontal manner for all operations, and providing mechanical aids and methods whereby no lifting of a completed roller is required by the operator.

Although particular embodiments of the invention have been shown and described in full here, there is no intention to thereby limit the invention to the details of such embodiments. On the contrary, the intention is to cover all modifications, alternatives, embodiments, usages and equivalence of the method and mechanism for rebuilding rollers as fall within the spirit and scope of the invention, specification and the appended claims.

I claim:

1. A rebuilding press for rebuilding a track vehicle rollers by rolling a roller from a trough onto a table into alignment with a ram used to assemble and disassemble the roller comprising, in a combination, an elongated frame, a ram mounted horizontally on said frame with its long axis parallel with the long axis of the frame, roller support means mounted on said frame for supporting said rollers in opposition to said ram, a table beneath said roller support means and ram and oriented therebetween, means for variably adjusting the height of said table, a trough, a frame supporting said trough at a level substantially the same as the table, means for connecting the trough with the table and for directing rollers from said trough to said table between said ram and said support means, and a discharge track, means for attaching said track at one of its ends of the said table in alignment with said connecting means to receive rollers from between said ram and support means, whereby rollers may be oriented with their axes angularly disposed relative to the trough, rolled over the connecting means to the table and discharged along the track after completion.

2. A rebuilding press in accordance with claim 1 wherein said means for connecting includes a bridge member removably mounted between one end of said trough and a location on the table between said ram and said support means.

3. A rebuilding press in accordance with claim 1 wherein said means for variably adjusting the height of said table includes a guide means for securing said table for vertical motion relative to the elongated frame,
a cam means for elevating the guide means,
and hand operated means for adjusting the cam means.

4. A rebuilding press in accordance with claim 1 wherein said trough defines a hole at a place adjacent said connecting means, said hole being large enough to receive a member that protrudes from one end of a roller.

5. A rebuilding press in accordance with claim 1 wherein said support means includes a pair of vertically spaced apart jaws disposed on said frame in opposed relation to said ram.

6. A rebuilding press in accordance with claim 5 wherein said discharge track comprises a pair of rails supported in parallelism with each other and each having oppositely curved ends, and means for attaching said track at one of its curved ends to said table.

References Cited in the file of this patent

UNITED STATES PATENTS

| | | |
|---|---|---|
| 961,375 | Seabrook | June 14, 1910 |
| 1,408,047 | Upp | Feb. 28, 1922 |
| 1,999,657 | Heath | Apr. 30, 1935 |
| 2,195,256 | Palmer | Mar. 26, 1940 |
| 2,660,778 | Gerner | Dec. 1, 1953 |
| 2,878,559 | Ryan | Mar. 24, 1959 |
| 2,934,819 | Sorensen | May 3, 1960 |